US005518428A

United States Patent [19]

Onoda

[11] Patent Number: 5,518,428

[45] Date of Patent: May 21, 1996

[54] SHIELD CONNECTOR

[75] Inventor: Katsuhiko Onoda, Shizuoka, Japan

[73] Assignee: Yazaki Corporation, Tokyo, Japan

[21] Appl. No.: 235,272

[22] Filed: Apr. 28, 1994

[30] Foreign Application Priority Data

Apr. 28, 1993 [JP] Japan .................................... 5-102702

[51] Int. Cl.[6] .......................... H01R 13/514; H02G 15/00

[52] U.S. Cl. ............................ 439/752; 439/595; 439/610

[58] Field of Search .................................... 439/595, 598, 439/752, 607, 610

[56] References Cited

U.S. PATENT DOCUMENTS

| | | | |
|---|---|---|---|
| 5,071,373 | 12/1991 | Nagasaka et al. | 439/752 |
| 5,181,862 | 1/1993 | Hawk | 439/752 X |
| 5,316,504 | 5/1994 | Jinno | 439/752 |
| 5,322,457 | 6/1994 | Tsuji et al. | 439/752 X |

FOREIGN PATENT DOCUMENTS

| | | |
|---|---|---|
| 61-157280 | 9/1986 | Japan . |
| 62-53910 | 11/1987 | Japan . |
| 4-54157 | 5/1992 | Japan . |

*Primary Examiner*—P. Austin Bradley
*Assistant Examiner*—Jill DeMello
*Attorney, Agent, or Firm*—Sughrue, Mion, Zinn, Macpeak & Seas

[57] ABSTRACT

A shield connector has a double retainment mechanism used for electric wirings of automobiles, and the object thereof is to provide a shield connector that is highly reliable and excellent in operability. Retaining arms for a terminal are arranged on a terminal housing so as to be erectable; in the retaining arms, a retaining projection having a tapered portion is arranged; the terminal housing having the terminal received in a terminal receiving chamber primarily retained by a retaining strip arranged on the terminal receiving chamber is inserted into an inner sleeve of a housing cover; whereby the tapered portion comes in contact with a guide slope arranged in the inner sleeve of the housing cover and is urged to thereby cause the retaining arms to fall down. As a result, the retaining projection gets fitted into a retaining portion of the terminal, so that the terminal can be doubly retained.

6 Claims, 6 Drawing Sheets

SHIELD CONNECTOR

BACKGROUND OF THE INVENTION

1. Field of the Invention

The invention relates to a shield connector having a double retainment mechanism used for electric wirings of automobiles.

2. Related Art

Conventionally, shield connectors used for shielding electric and magnetic effects from outside come in various types. For example, a shield connector S shown in FIGS. 12 and 13 is proposed in Unexamined Japanese Utility Model Publication No. 61-157280.

The shield connector S is designed so that a terminal housing c formed of an insulating material is inserted and attached to a terminal mounting hole b arranged in a shield connector housing a that is formed of a high molecular material containing an electrically conducting filler.

In the terminal housing c, a flexible terminal retaining portion d is provided. The terminal housing c is retained in the connector housing a by first retaining a terminal e inserted into the terminal housing c by the terminal retaining portion d; then inserting and attaching the terminal housing c to the terminal mounting hole b so that a retaining projection f of the terminal housing c is engaged with a retaining recessed portion g arranged on the inner wall of the connector housing a.

Thus, in the shield connector S, the terminal e is retained only in the terminal housing c by the terminal retaining portion d, with no double retainment provided. Therefore, the terminal e is easy to come off due to vibrations or the like during use.

Since the shield connector housing is generally electrically conducting, the terminal does conduct electricity when directly retained by the shield connector. When double retainment is to be provided in order to make the retainment of the terminal reliable, a technique for using special parts is conceivable. However, such a solution not only increases the number of parts, but also makes the inserting and attaching operation complicated.

SUMMARY OF THE INVENTION

The invention has been made in view of the above circumstances. Accordingly, the object of the invention is to provide a shield connector that allows terminals to be retained doubly, that makes the retainment highly reliable, and that ensures excellent handling ease.

To achieve the above object, the invention is applied to a shield connector including: a housing cover having an electrically conducting inner sleeve; a terminal housing being formed of an insulating material and having a terminal receiving chamber; and a terminal to be received in the terminal receiving chamber. In such a shield connector, a guide slope is arranged in the inner sleeve of the housing cover; a retaining strip for the terminal is arranged in the terminal receiving chamber; retaining arms for the terminal are arranged on a circumferential wall of the terminal housing so as to be erectable; a retaining projection having a tapered portion so as to correspond to the guide slope of the housing cover is arranged on the retaining arms; the terminal housing retaining the terminal received in the terminal receiving chamber by the retaining strip is inserted into the inner sleeve of the housing cover, whereby the tapered portion of the retaining projection is brought into contact with the guide slope of the housing cover and urged, so that the retaining projection is engaged with the retaining portion of the terminal to thereby allow the terminal to be doubly retained in the terminal housing.

The shield connector of the invention is characterized as having not only the retaining strip in the terminal receiving chamber of the terminal housing, but also the retaining arms on the circumferential wall of the terminal housing. Therefore, by inserting the terminal housing with the terminal primarily retained by the retaining strip within the terminal receiving chamber into the inner sleeve of the housing cover, the tapered portion of the retaining arms arranged on the circumferential wall of the terminal housing comes in contact with the guide slope of the inner sleeve of the housing cover. The successive sliding of the tapered portion over the guide slope in association with the entrance of the terminal housing causes the tapered portion to be urged to thereby cause the retaining arms to fall. As a result, the retaining projection is fitted into the retaining portion of the terminal, thereby secondarily retaining the terminal.

Therefore, the terminal is retained doubly by the retaining strip of the terminal housing and the retaining projection of the retaining arms, which prevents the terminal from coming off for sure. In addition, the falling down of the retaining arms can be effected by inserting the terminal housing into or pulling the terminal housing out of the inner sleeve of the housing cover, which requires no special operation for retaining the terminal doubly, thereby contributing to improving operability.

DETAILED DESCRIPTION OF THE DRAWINGS

FIG. 11 is a perspective view of a counterpart terminal to be engaged with the shield connector of FIG. 6, a shield case thereof, and the like;

DETAILED DESCRIPTION OF THE PREFERRED EMBODIMENTS

Figure 1:
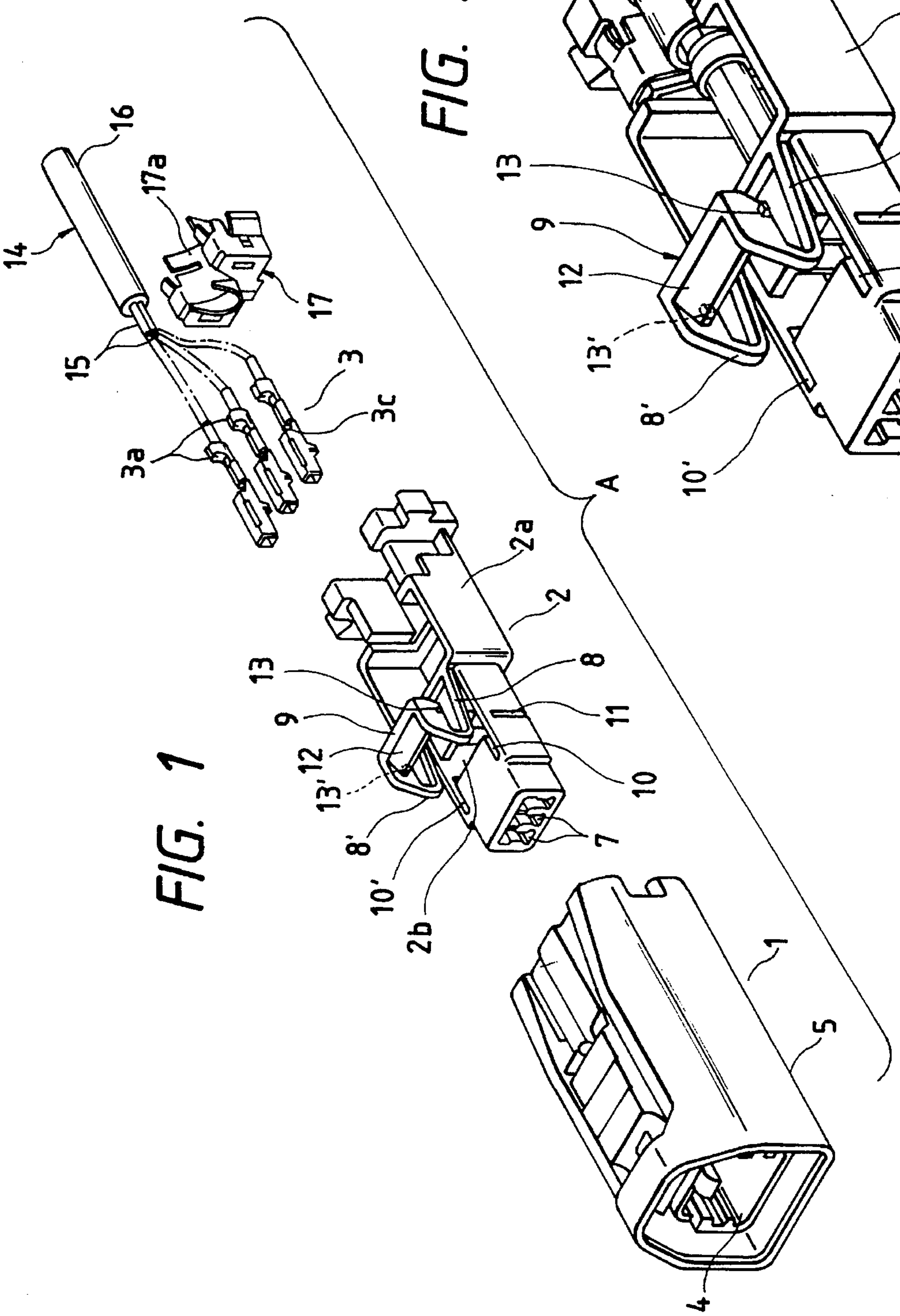
FIG. 1 is a perspective view showing a shield connector, which is an embodiment of the invention, in exploded form.

FIG. 1 is a perspective view showing a shield connector A, which is an embodiment of the invention, in exploded form.

The shield connector A includes: a housing cover 1; a terminal housing 2 to be received in the housing cover 1; and terminals 3 to be inserted and attached to the terminal housing 2.

For the purpose of shielding, the housing cover 1 has an inner sleeve 4 that is formed while enclosed by an electrically conducting material such as a metal plate or by metal-plating a synthetic resin material, and an outer sleeve 5 formed so as to enclose the inner sleeve 4. The inner sleeve 4 is designed to receive the terminal housing 2.

While it is possible to fabricate the inner sleeve 4 and the outer sleeve 5 at the same time by monolithic molding, these components may be fabricated by forming synthetic resin members separately, and integrating the formed materials after metal-plating the inner sleeve 4.

Figure 3:
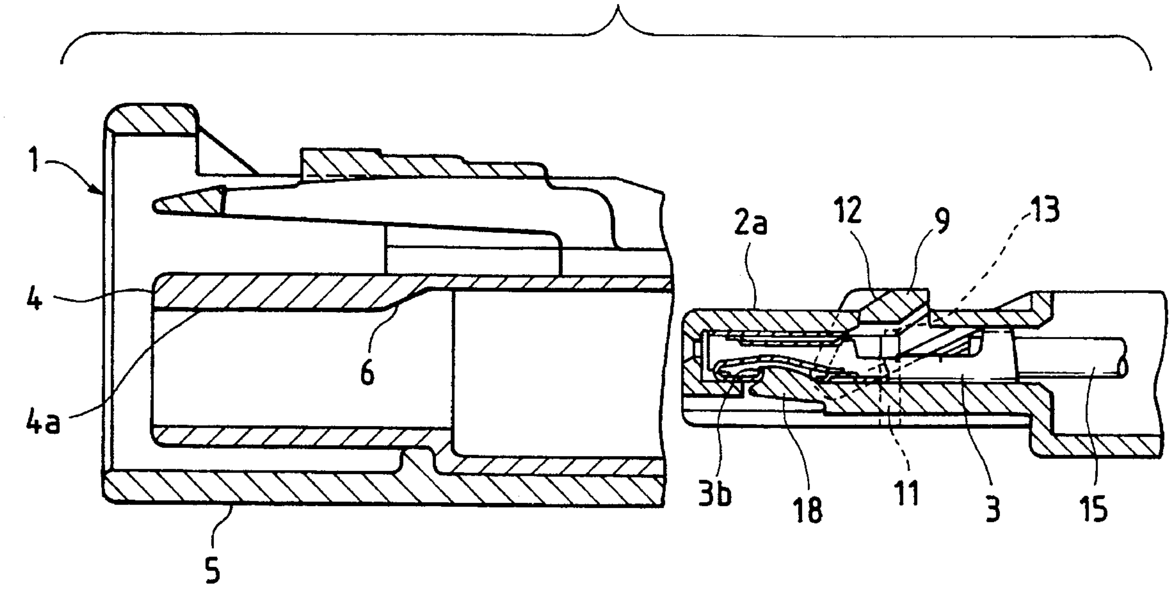
FIG. 3 is a sectional view showing the process of inserting the terminal housing into an inner sleeve of a housing cover of FIG. 1.

As shown in FIG. 3, a guide slope 6 is provided on the inner side of a ceiling wall 4*a* of the inner sleeve 4, the guide slope being declined toward an opening 4*b* for a counterpart connector.

The terminal housing 2 is designed so that a plurality of terminal receiving chambers 7 are provided in a front end portion within a circumferential wall 2*a* that is made of an insulating synthetic resin in box form. Two L-shaped flexible retaining arms 8, 8' are projected from the upper side of the circumferential wall 2*a*. A retaining projection 9 formed by coupling the free end portions of the respective retaining arms 8, 8' with each other is provided.

Not only arm receiving grooves 10, 10' for receiving the retaining arms 8, 8' and a retaining window 2*b* for receiving the retaining projection 9, but also guide grooves 11, 11' for ushering the retaining arms 8, 8' are also arranged in the circumferential wall 2*a*.

A tapered portion 12 that is declined toward the terminal receiving chambers 7 is formed on the retaining projection 9. Retaining pawls 13, 13' are arranged on both outer lateral sides of the retaining projection 9, respectively. As a result, the retaining arms 8, 8' can be erected and fallen stably by causing the retaining pawls 13, 13' to slide along the guide grooves 11, 11' of the circumferential wall 2*a*.

Figure 2:
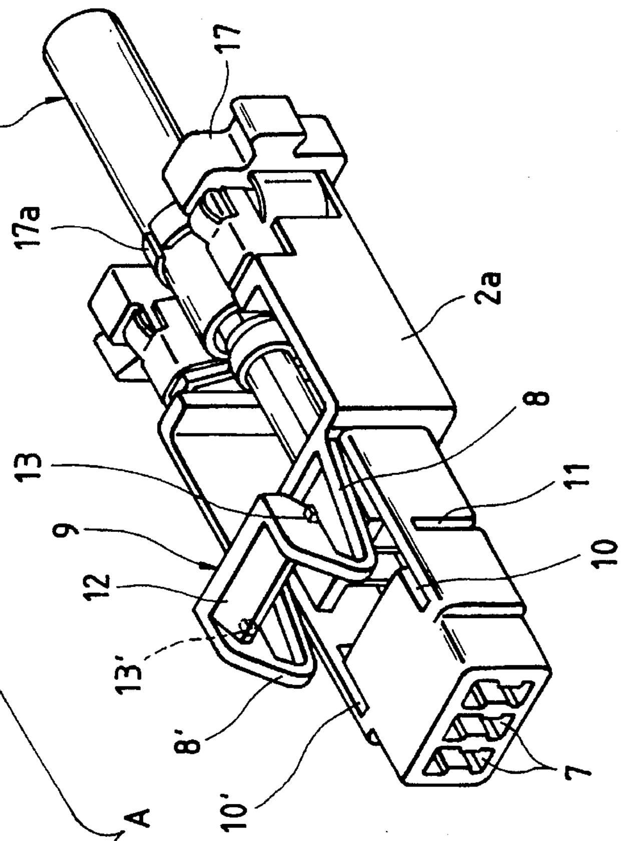
FIG. 2 is a perspective view showing a state in which a terminal having a shield wire connected thereto is inserted into a terminal housing of FIG. 1.

The terminals 3 are connected to a plurality of sheathed wires 15 contained in a shield wire 14 at wire connecting portions 3*a*. The shield wire 14 is held by a shield wire terminal 17 with a shield portion 16 that is formed on the outer layer thereof caulked by a caulking portion 17*a* of the shield wire terminal 17 as shown in FIG. 2, and the terminals 3 are inserted and attached to the terminal housing 2. As shown in FIG. 3, the terminal 3 under this condition is inserted into the terminal receiving chamber 7 of the terminal housing 2, and gets retained primarily with a retaining strip 18 provided on the bottom wall of the terminal receiving chamber 7 abutted against a lower side retaining portion 3*b* of the terminal 3.

Figure 4:
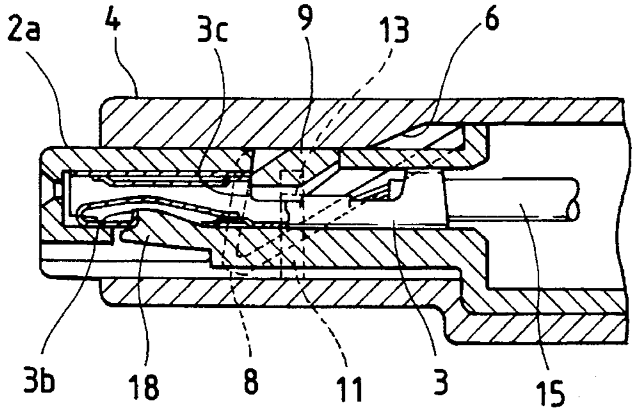
FIG. 4 is a sectional view showing a state in which the terminal is doubly retained with the terminal inserted into the inner sleeve of the housing cover of FIG. 3.

When the terminal housing 2 is inserted into the inner sleeve 4 of the housing cover 1 as shown by the arrow, the tapered portion 12 of the retaining projection 9 comes in contact with the guide slope 6 arranged on the ceiling wall 4*a* of the inner sleeve 4. Then, the retaining projection 9 slides down along the guide slope 6 as the terminal housing 2 further enters, which in turn urges the retaining projection 9. As a result, the retaining projection 9 gets fitted into a retaining portion 3*c* arranged on the upper side of the terminal 3 as shown in FIG. 4, thus allowing the terminal 3 to be retained secondarily. Therefore, the terminal 3 is doubly retained by the retaining strip 18 and the retaining projection 9.

As the retaining arms 8, 8' fall down, the retaining pawls 13, 13' of the retaining projection 9 are fitted into the retaining grooves 11, 11', respectively, so that the retaining arms 8, 8' are retained in the terminal housing 2.

Figure 5:
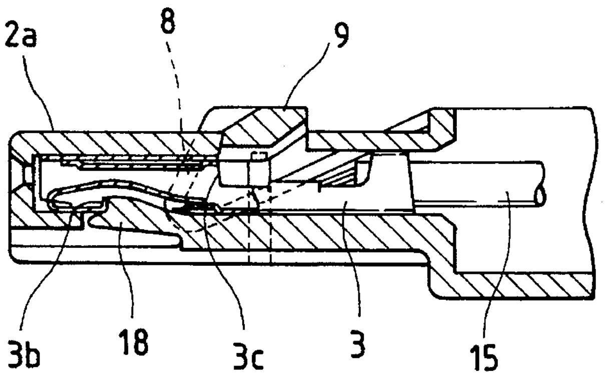
FIG. 5 is a diagram illustrative of a state in which the terminal housing is pulled out of the inner sleeve of the housing cover of FIG. 4.

To remove the terminal 3 from the terminal housing 2, the terminal housing 2 is pulled out of the inner sleeve 4 of the housing cover 1. As a result, as shown in FIG. 5, the retaining arms 8, 8' erect by resiliency thereof to raise the retaining projection 9. Thus, the retaining projection 9 is automatically released from the upper side retaining portion 3*c* of the terminal 3, bringing the terminal back to the primarily retained state similar to that shown in FIG. 3. Then, by releasing the retaining strip 18 from the lower side retaining portion 3*b* of the terminal 3, the terminal 3 can be pulled out.

Figure 6:
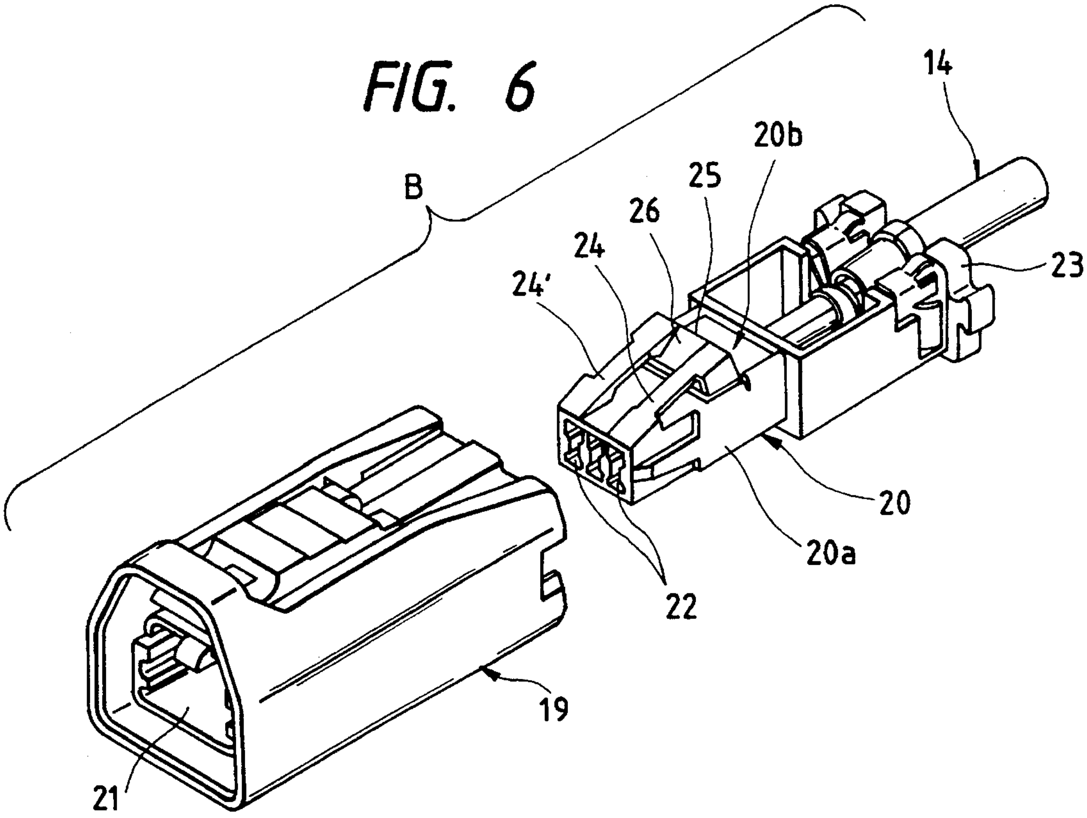
FIG. 6 is a perspective view of a shield connector, which is another embodiment of the invention.
Figure 7:
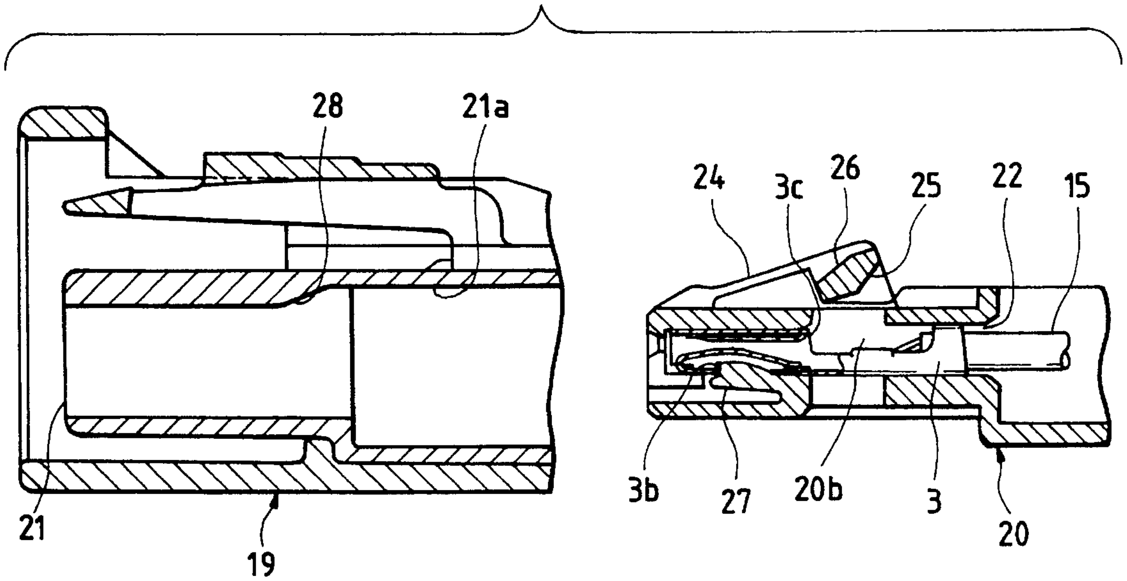
FIG. 7 is a longitudinal sectional view of a housing cover and a terminal housing of FIG. 6.

FIG. 6 is a perspective view of a shield connector B, which is another embodiment of the invention; and FIG. 7 is a longitudinal sectional view thereof.

The shield connector B includes: a housing cover 19; and a terminal housing 20 having terminals 3 that are connected to sheathed wires 15 contained in a shield wire 14 similar to that of the above-mentioned embodiment.

The housing cover 19 has an electrically conducting inner sleeve 21 that receives therein the terminal housing 20 in a manner substantially similar to the housing cover 1 of the above-mentioned embodiment.

As in the terminal housing 2 of the above-mentioned embodiment, the terminal housing 20 is designed to provide terminal receiving chambers 22 in a front end portion thereof and allow a shield wire terminal 23 to be inserted and attached to the rear end thereof. Unlike the terminal housing 2 of the above-mentioned embodiment, two flexible retaining arms 24, 24', which are erected from the front end of a circumferential wall 20*a* and extend obliquely toward the rear end portion, are provided. The free end portions of the retaining arms 24, 24' are coupled with each other by a retaining projection 25 that has a tapered portion 26.

The upper side of the circumferential wall 20*a* is designed so that a retaining window 20*b* is opened. This is to allow the retaining projection 25 to be received therein when the retaining arms 24, 24' are caused to fall down.

As shown in FIG. 7, the terminal 3 inserted into the terminal receiving chamber 22 is primarily retained by a retaining strip 27 arranged on the circumferential wall of the terminal receiving chamber 22 being abutted against a lower side retaining portion 3*b* of the terminal 3.

Figure 8:
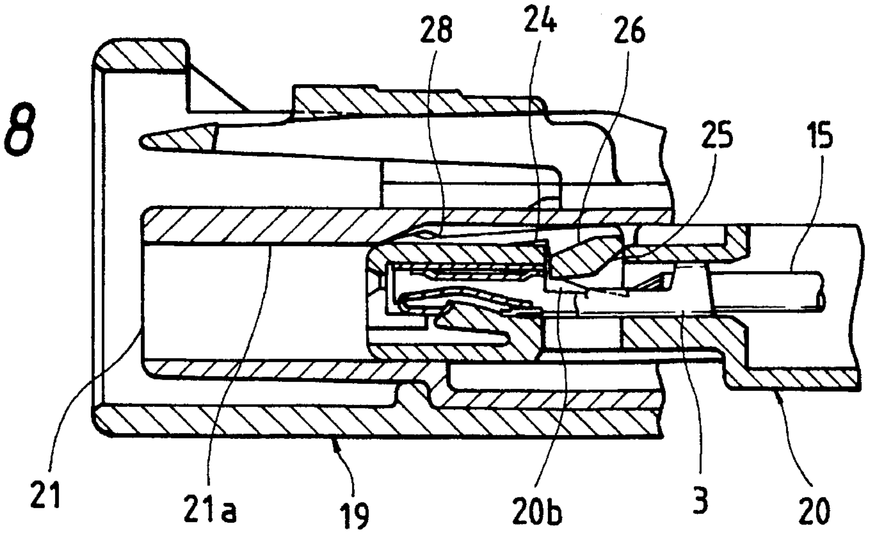
FIG. 8 is a diagram illustrative of the process of inserting the terminal housing into the inner sleeve of the housing cover of FIG. 7.
Figure 9:
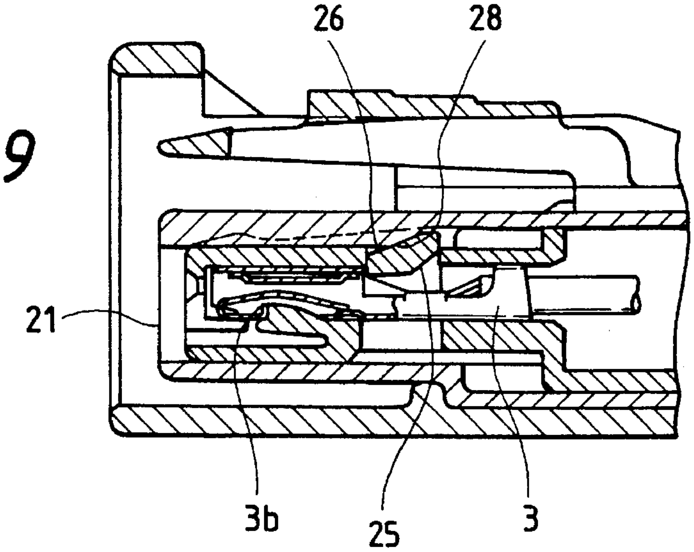
FIG. 9 is a diagram illustrative of a state in which the terminal housing of FIG. 8 is further inserted.

When the terminal housing 20 with the terminal 3 inserted and attached thereto is inserted into the inner sleeve 21 of the housing cover 19, the retaining arms 24, 24' come in contact with a ceiling wall 21*a* of the inner sleeve 21 to be urged thereagainst, and as shown in FIG. 8, the retaining arms 24, 24' fall down to cause the retaining projection 25 to enter into the retaining window 20*b*.

Figure 10:
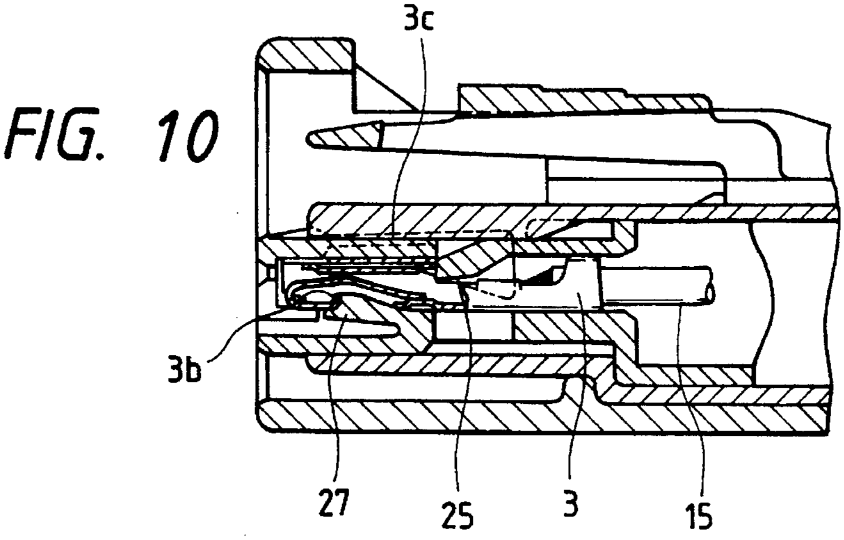
FIG. 10 is a sectional view showing a state in which the terminal is doubly retained with the terminal housing completely inserted into the inner sleeve of the housing cover of FIG. 9.

When the terminal housing 20 is pushed into the inner sleeve 21, a guide slope 28 arranged on the ceiling wall 21*a* of the inner sleeve 21 comes in contact with the tapered portion 26 of the retaining projection 25 as shown in FIG. 8. When the terminal housing 20 is further entered, the retaining projection 25 is urged downward by sliding over the guide slope 28 as shown in FIG. 10, and with the retaining projection 25 fitted into the retaining portion 3*c* arranged on the upper side of the terminal 3, the terminal 3 is retained secondarily. Therefore, the terminal 3 can be doubly retained by the retaining strip 27 and the retaining projection 25.

Since the retaining arms 24, 24' of the terminal housing 20 are erected obliquely from the front end portion of the circumferential wall 20*a* toward the rear end portion thereof, the retaining arms 24, 24' can be fallen down smoothly as well as stably as the terminal housing 20 is inserted into the inner sleeve 21 of the housing cover 19.

Figure 11:
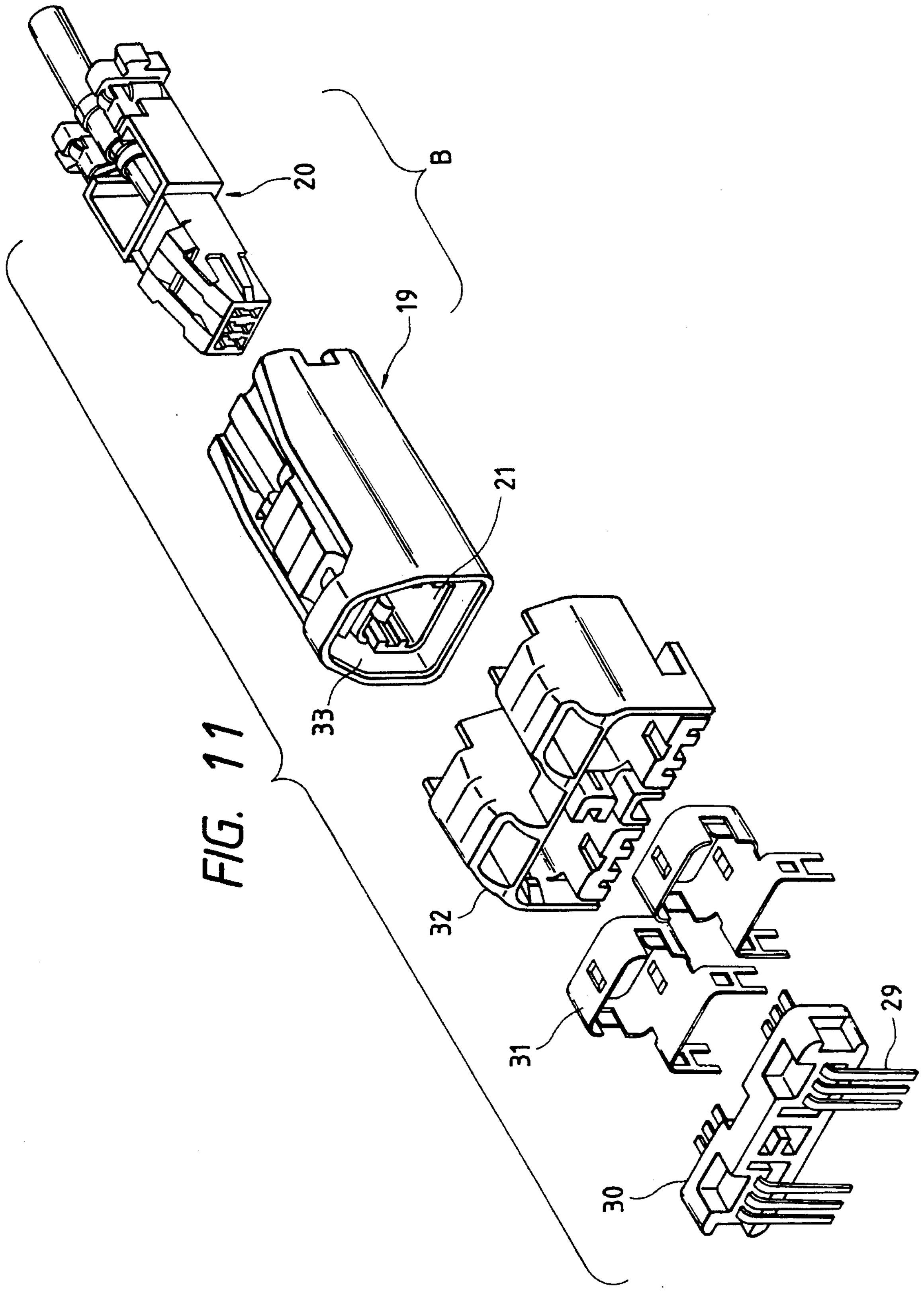
Figure 12:
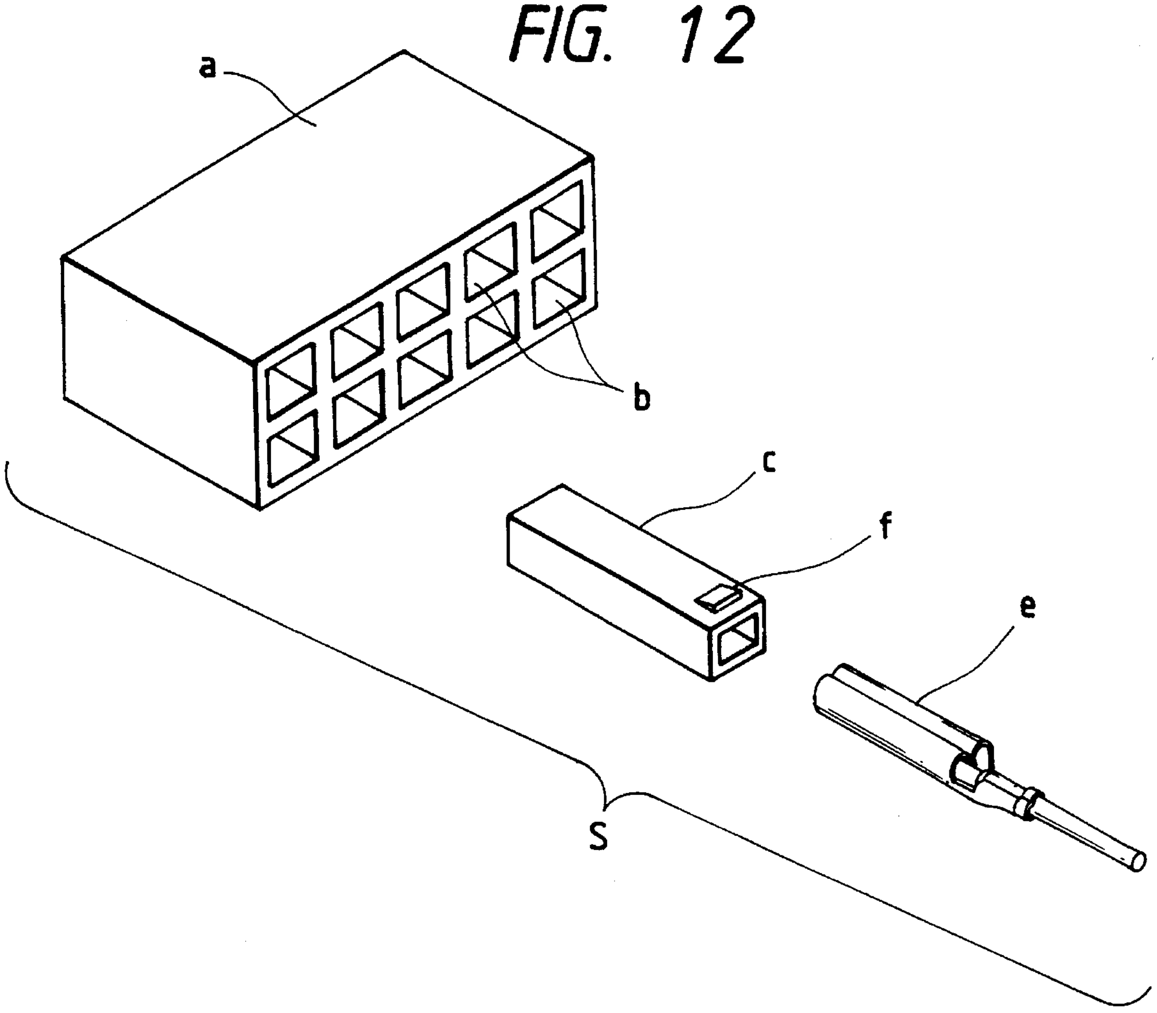
FIG. 12 is a perspective view of a conventional shield connector.
Figure 13:
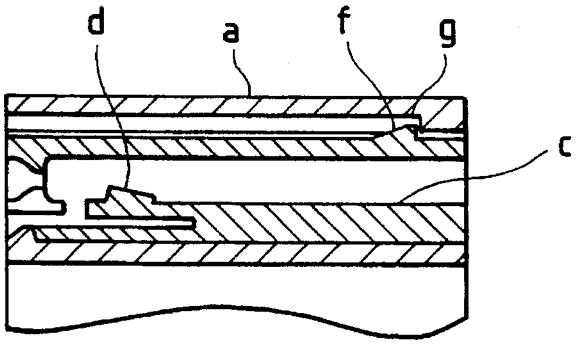
FIG. 13 is a sectional view of a connector housing of FIG. 12.

FIG. 11 is a perspective view showing an exemplary attachment for shielding a counterpart terminal to be engaged with the shield connector B.

A male terminal 29 to be engaged with the terminal 3 within the shield connector B is held so as to pass through a terminal holder 30. The outer circumference of the terminal holder 30 is enclosed by an electrically conducting shield case 31, and is received in a male housing 32 that is formed of an insulating synthetic resin. Then, the male housing 32 is inserted into the space between an outer sleeve 33 and the inner sleeve 21 of the housing cover 19 of the shield connector B, whereby the terminal 3 within the terminal housing 20 of the shield connector B and the male terminal 29 can be engaged with each other.

The male terminal 29, the terminal holder 30, the shield case 31, the male housing 32, and the like can be used for the housing cover 1 of the shield connector A similarly.

The shield connector of the invention is characterized as having the retaining arms on the circumferential wall of the terminal housing independently of the retaining strip provided in the terminal receiving chamber. Therefore, when the terminal housing is to be inserted into the inner sleeve of the housing cover, the tapered portion of the retaining arms comes in contact with the guide slope of the housing cover and gets urged, thereby causing the retaining arms to fall down to fit the retaining projection thereof into the retaining portion of the terminal to retain the terminal secondarily.

As a result, the terminal is retained not only primarily by the retaining strip, but also doubly by the retaining projection of the retaining arms, which in turn prevents the terminal from coming off for sure. In addition, the retaining arms can be erected or fallen down by the terminal housing being inserted into or pulled out of the inner sleeve of the housing cover, which provides the advantage that no special operation is required to doubly retain the terminal, thereby contributing to improving the operability for inserting and attaching the terminal.

What is claimed is:

1. A shield connector comprising:

a housing cover having an electrically conducting inner sleeve;

a terminal housing formed of an insulating material and having a terminal receiving chamber, the terminal housing being detachably received in said sleeve of the housing cover;

a terminal to be received in the terminal receiving chamber;

first locking means provided on said terminal housing for locking the terminal in the terminal receiving chamber; and second locking means provided on said terminal housing for secondarily locking the terminal in the terminal receiving chamber as the terminal housing is inserted into the sleeve of the housing cover, wherein said first locking means locks said terminal before said terminal housing is even partially inserted into said sleeve of said housing cover.

2. A shield connector of claim 1, wherein said first locking means includes a projecting finger extending into said terminal receiving chamber, and said second locking means includes a retaining projection flexibly attached to said terminal housing and including a tapered portion.

3. A shield connector as claimed in claim 2, wherein said inner sleeve includes a sloped surface constituting a guide slope, and wherein when the terminal housing, retaining the terminal received in the terminal receiving chamber by the projecting finger, is inserted into the inner sleeve of the housing cover, the tapered portion of the retaining projection is brought into contact with the guide slope of the housing cover and urged, so that the retaining projection is engaged with a retaining portion of the terminal to thereby allow the terminal to be doubly retained in the terminal housing.

4. A shield connector comprising:

a housing cover having an electrically conducting inner sleeve, a guide slope being arranged in the inner sleeve of the housing cover;

a terminal housing formed of an insulating material and having a terminal receiving chamber, the terminal housing being detachably received in said sleeve of the housing cover;

a terminal receivable in the terminal receiving chamber; and locking means for locking the terminal in the terminal receiving chamber, said locking means being slidably received in said terminal housing so as to be movable from an unlocked position disengaged from said terminal to a locked position engaged with said terminal, wherein said terminal housing includes grooves and said locking means includes locking projections received in said grooves.

5. A shield connector comprising:

a housing cover having an electrically conducting inner sleeve, a guide slope being arranged in the inner sleeve of the housing cover;

a terminal housing formed of an insulating material and having a terminal receiving chamber, the terminal housing being detachably received in said sleeve of the housing cover;

a terminal receivable in the terminal receiving chamber; and locking means for locking the terminal in the terminal receiving chamber, said locking means being slidably received in said terminal housing so as to be movable from an unlocked position disengaged from said terminal to a locked position engaged with said terminal, wherein said locking means includes hinge portions and an engagement portion, said engagement portion being thicker than said hinge portion.

6. A shield connector comprising:

a housing cover having an electrically conducting inner sleeve, a guide slope being arranged in the inner sleeve of the housing cover;

a terminal housing formed of an insulating material and having a terminal receiving chamber, the terminal housing being detachably received in said sleeve of the housing cover;

a terminal insertable into the terminal receiving chamber in a direction of a front end of said terminal housing;

locking means for locking the terminal in the terminal receiving chamber, said locking means including an inclined hinge portion extending from said front end of said terminal housing toward a rear end thereof and an engagement portion connected to said hinge portion, wherein as said terminal housing is inserted into said inner sleeve, said locking means abuts against said guide slope so that said hinge portion is rotated causing said engagement portion to engage said terminal.

* * * * *